United States Patent [19]
Horiuchi et al.

[11] Patent Number: 5,159,505
[45] Date of Patent: Oct. 27, 1992

[54] ROTATING DRUM HAVING A CENTER OF GRAVITY IN REGISTRY WITH AN AXIS OF ROTATION

[75] Inventors: Yasuaki Horiuchi, Hachioji; Kuninori Imai, Kanagawa; Takeshi Tajima, Tokyo; Takeo Yamashita, Tachikawa; Shigekazu Otomo, Sayama; Noriyuki Kumasaka, Ome, all of Japan

[73] Assignee: Hitachi, Ltd., Tokyo, Japan

[21] Appl. No.: 531,335

[22] Filed: May 31, 1990

[30] Foreign Application Priority Data

May 31, 1989 [JP] Japan ................ 1-136022

[51] Int. Cl.⁵ ............... G11B 5/52; G11B 21/04; G11B 21/18; G11B 5/10
[52] U.S. Cl. ................... 360/84; 360/107; 360/129; 360/130.24
[58] Field of Search ........... 360/107, 108, 130.24, 360/95, 84, 85, 130.23, 130.22, 129, 128

[56] References Cited

U.S. PATENT DOCUMENTS

| | | | |
|---|---|---|---|
| 4,212,043 | 7/1980 | Baker | 360/109 |
| 4,316,225 | 2/1982 | Maruyama et al. | 360/107 |
| 4,366,519 | 12/1982 | Maruyama et al. | 360/130.24 |
| 4,703,370 | 10/1987 | Inoue et al. | 360/130.24 |
| 4,786,011 | 11/1988 | Fujiwara et al. | 360/130.24 |

FOREIGN PATENT DOCUMENTS 562162  6/1954  Japan .
55-101132  8/1980  Japan .

*Primary Examiner*—John H. Wolff
*Assistant Examiner*—Craig A. Renner
*Attorney, Agent, or Firm*—Fay, Sharpe, Beall, Fagan, Minnich & McKee

[57] ABSTRACT

A rotating drum for use in a magnetic recording system. A magnetic head is mounted on the rotating drum, and a magnetic recording medium is wound on the rotating drum, and the rotating drum is rotated so as to read and write signals. Alternatively, the magnetic recording medium is mounted on the rotating drum, and signals are read and written by a magnetic head fixed exteriorly of the rotating drum. The rotating drum has at least one opening or notch in a magnetic recording medium-winding surface thereof. In order to restrain the deformation of the rotating drum during the rotation thereof, the center of gravity of the drum is disposed substantially in registry with the axis of rotation of the drum.

9 Claims, 9 Drawing Sheets

ROTATING DRUM HAVING A CENTER OF GRAVITY IN REGISTRY WITH AN AXIS OF ROTATION

BACKGROUND OF THE INVENTION

This invention relates to a rotating drum for use in a magnetic storage system in which read and write operations are effected using the rotating drum. Examples of such magnetic storage system include a video tape recorder (VTR), a mass storage system (MSS) and a data recorder in which a magnetic head is moved relative to and into contact with a magnetic recording medium to effect read and write operations. Such a rotating drum is also used in a magnetic-recording characteristics measuring system in which a magnetic recording medium is moved relative to and into contact with a fixed magnetic head to effect read and write operations. More particularly, the invention relates to the structure and shape of such a drum which ensure stable read and write characteristics.

There have been widely used magnetic recording systems in which a magnetic recording medium is wound around a rotating drum, and read and write operations are effected by a magnetic head. A typical example of such magnetic recording systems is a video tape recorder (VTR). The advantage of the rotating drum is that a relative speed between the magnetic head and the magnetic recording medium can be increased while keeping the system to a small size.

In the magnetic recording system having such a rotating drum, in order to stabilize read and write characteristics, it is very important to maintain a good condition of contact between the magnetic head and the magnetic recording medium. For this reason, a magnetic recording medium-winding surface (i.e., outer peripheral surface) of the drum is quite precisely finished or worked with respect to roundness and surface roughness. At present, an aluminum alloy is usually used as a material constituting a rotating drum device. The reason for this is that an aluminum alloy is lightweight and has a high machinability and non-magnetic properties. On the other hand, an aluminum alloy is disadvantageous in that it has a relatively low rigidity and therefore is liable to be deformed when subjected to an external or applied force.

FIG. 5 is a bird's eye view of a conventional rotating drum, and FIG. 6 is a top plan view of the conventional drum, and FIG. 7 is a sectional view of the conventional drum. As shown in these Figures, an opening or notch (window) 2 for projecting a magnetic head is formed through the peripheral wall of the drum. Examples of rotating drums having such an opening or notch are disclosed in Japanese Laid-Open (Kokai) Patent Application No. 55-101132/(A) and Japanese Laid-Open Utility Model Application No. 56-2162/(A).

In the case of a rotating drum of the type containing a magnetic recording medium, the above-mentioned opening or notch serves as a window for pulling out the magnetic recording medium. Because of the provision of such an opening or notch, the drum is subjected to irregular deformation when the drum is rotated, so that the recording medium-winding surface of the drum becomes out of a uniform circular shape. As a result, the contact between the magnetic head and the magnetic recording medium becomes unstable. In currently-available video tape recorders etc., the rotation frequency (rotational speed) of the drum is about 2,000 rpm, and the relative speed between the magnetic head and the magnetic recording medium is about 10 m/sec. Therefore, actually, the influence of the drum deformation on the read and write characteristics is small. However, as the recording frequency increases as a result of a higher picture resolution and a higher recording density, the required relative speed becomes higher. Therefore, it is indispensable to increase the rotation frequency of the drum in which case the centrifugal force is increased in proportion to the square of the relative speed. As a result, the deformation of the drum can not be disregarded. On example of such situation will be described below.

FIG. 8 shows results of measurements of deformation of a magnetic recording medium-winding surface 3 of the conventional rotating drum of FIGS. 6 and 7 at various rotation frequencies of the drum. The medium-winding surface 3 of this conventional rotating drum had a diameter 7 of 110 mm (i.e., a radium of 55 mm), and the diameter 8 of an inner peripheral surface 4 was 88 mm, and a height 9 of the rotating drum was 50 mm, and a depth (h) 15 of the inner peripheral surface of the rotating drum extending between the upper end of the drum and the inner bottom surface was 35 mm. The opening 2 formed through the peripheral wall of the rotating drum had a width (w) 14 of 10.5 mm in the circumferential direction of the drum, and a height of 8 mm. When the rotating drum is rotated, the amount of radial displacement of the medium-winding surface 3 starting from the state of response of the drum (that is, a variation in the distance between the medium-winding surface 3 and the center or axis 6 of rotation of the drum) increases as the rotation frequency increases, as shown in FIG. 8. However, a practical problem to be noted is the amplitude of deformation of the medium-winding surface 3 within the overall circumference. This deformation amount reaches 5 to 6 $\mu$m at 5,000 rpm, and as large as 25 $\mu$m at 10,000 rpm. In such condition, the contact between the magnetic head and the magnetic recording medium is quite unstable, and therefore signals can not be read and written in a stable manner.

As described above, in the conventional rotating drum, there is not provided any means for dealing with the increase of stresses developing during a high-speed rotation of the rotating drum. Therefore, the rotating drum is subjected to irregular deformation at a high-speed rotation frequency, which results in a problem that a stable contact between the magnetic head and the magnetic recording medium can not be maintained.

SUMMARY OF THE INVENTION

With the above deficiencies of the prior art in view, it is an object of this invention to provide a rotating drum of such a shape that deformation of the rotating drum can be kept to a very small level even when stresses acting on the rotating drum increase as a result of a high speed rotation of the drum.

Another object of the invention is to provide a magnetic-recording characteristics measuring system for evaluating the condition of magnetic recording using such a rotating drum.

A feature of the present invention is that in order to restrain or suppress the deformation of the rotating drum when the drum is rotated at predetermined speeds, the rotating drum is beforehand worked or processed in such a manner that the center of gravity of the drum is substantially in registry with the axis of rotation of the drum.

DESCRIPTION OF THE PREFERRED EMBODIMENTS OF THE INVENTION

The invention will now be described with reference to the drawings.

Figure 1:
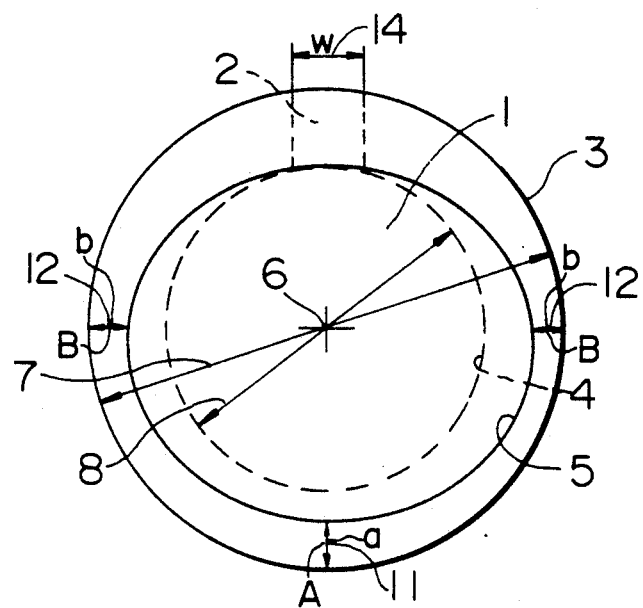
FIG. 1 is a top plan view of a rotating drum according to an embodiment of the present invention.
Figure 2:
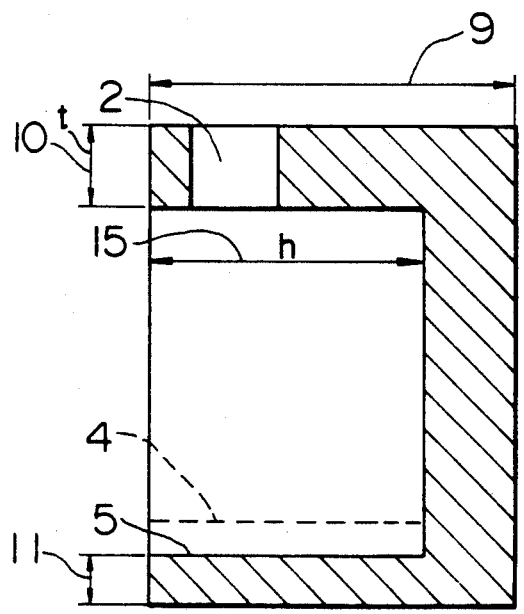
FIG. 2 is a sectional view of the drum.

FIG. 1 is a top plan view of an embodiment of a rotating drum of the present invention. FIG. 2 is a sectional view of the drum of FIG. 1.

The body of rotating drum 1 is made of an aluminum alloy such as 7075 alloy defined by JIS (Japanese Industrial Standard). A magnetic recording medium-winding surface 3 of the rotating drum 1 is so precisely finished over an entire circumference thereof that the medium-winding surface 3 has a deviation of a roundness of not more than 0.5 $\mu$m and a surface roughness Ra of not more than 0.025 $\mu$m. An opening 2 is formed through the peripheral wall of the drum 1. The opening 2 is a window for projecting a magnetic head, and in the case of the type of rotating drum containing a magnetic recording medium therein, the opening is a window for pulling out the magnetic recording medium. Although in the illustrated embodiment, the opening 2 is only one, a plurality of such openings 2 may be provided and spaced either circumferentially of the drum 1 in a common circular plane or vertically displaced from each other. Explanation will be made with respect to the case where only one opening 2 is provided hereinafter, but in the case of a plurality of such openings 2, the purpose can be achieved by applying the same design to each opening. An inner peripheral surface 4 of the drum 1 is circular, and this inner peripheral surface 4 and the medium-winding surface 3 has a common center 6. The center 6 is also the center (axis) of rotation of the rotating drum 1. A worked or machined inner peripheral surface 5 is an inner peripheral surface of the drum 1 which is corrected in shape so as to keep the deformation of the medium-winding surface 3 to a minimum when the drum 1 is rotated at a predetermined speed (rotation frequency).

Figure 3:
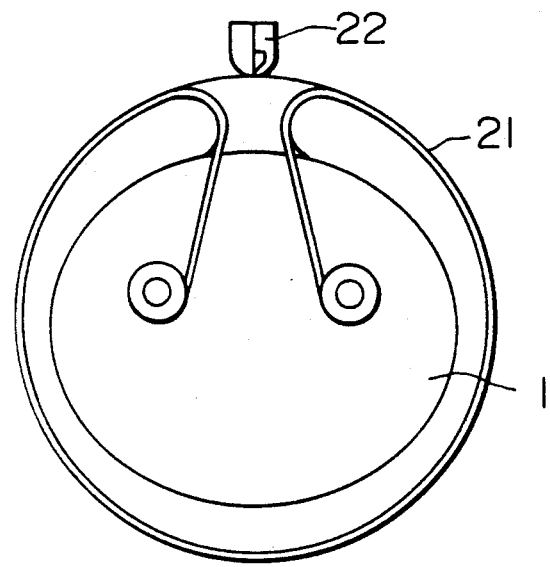
FIG. 3 is a view of a rotating drum of FIG. 1 having a magnetic recording medium attached thereto.
Figure 4:
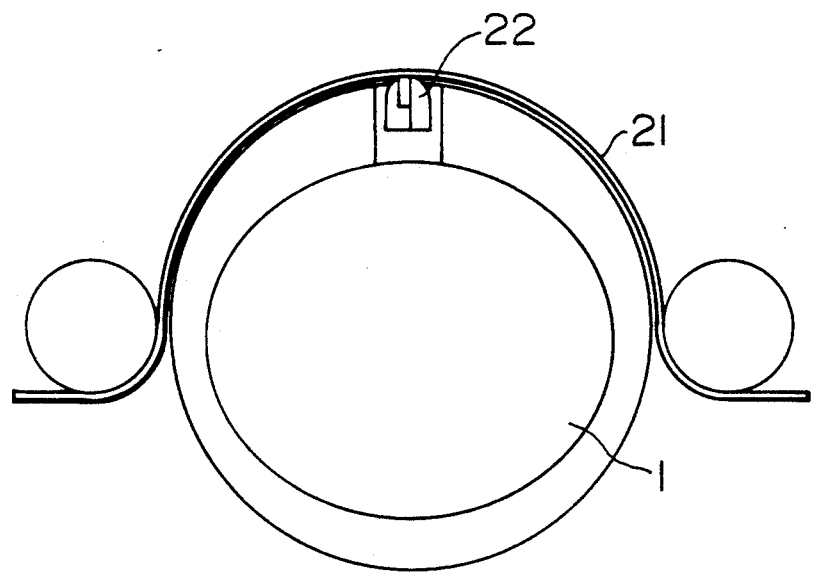
FIG. 4 is a view of a rotating drum of FIG. 1 having a magnetic head mounted thereon.
Figure 5:
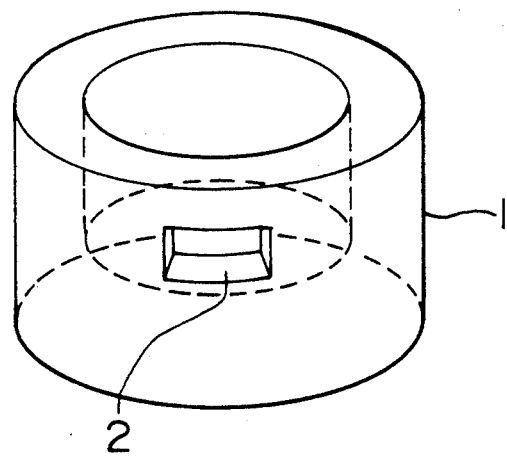
FIG. 5 is a bird's eye view of a conventional rotating drum.

To provide an example of actual use, as shown in FIG. 3, a magnetic recording medium 21 is attached to the above-mentioned rotating drum 1 according to the embodiment of the present invention, and the rotating drum 1 was rotated so that a fixed magnetic head 22 separate from the rotating drum 1 effects read and write operations. Also, as another example of actual use, as shown in FIG. 4, a magnetic head 22 is attached to the rotating drum 1 according to the embodiment of the present invention, and the rotating drum 1 is rotated, and a magnetic recording medium 21 is wound around the rotating drum 1 to thereby effect read and write operations.

The shape of the rotating drum 1 will now be described in further detail. The outer diameter and height of the rotating drum 1 and the shape of the opening 2 are the same as described above for the conventional rotating drum; however, in this embodiment, the inner peripheral surface 4 was worked or machined in the following manner. Namely, as shown in FIG. 1, the width (w) 14 of the opening 2 was 10.5 mm, and the thickness (t) 10 of the opening 2 was 11 mm. The thickness (a) 11 of a portion A of the peripheral wall of the drum 1 disposed symmetrically to the opening 2 with respect to the rotation center 6 was 10 mm. And, the thickness (b) 12 of each of the diametrically-opposite portions B of the peripheral wall angularly displaced ±90° from the opening 2 was 9 mm. The opening 2, the portion A and the portions B were interconnected together at their insides by respective smooth surfaces. The worked inner peripheral surface 5 was obtained by thus working the original inner peripheral surface 4. The index e representative of variations in the thickness of the peripheral wall of the drum may be expressed by the following formula:

$$e = (r-a)/(r-b)$$

In this embodiment, the value of e was 0.978.

Figure 9:
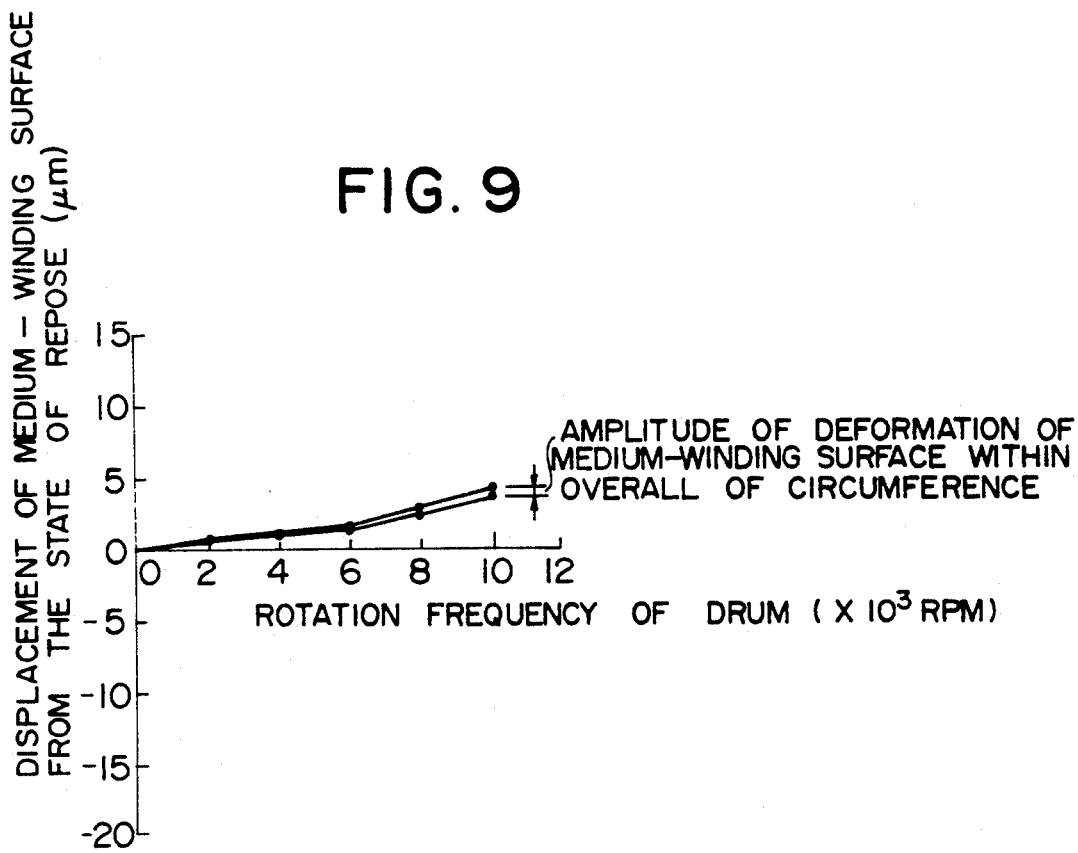
FIG. 9 is a graph showing the amount or amplitude of deformation of the rotating drum according to an embodiment of the present invention.

Next, the deformation of the rotating drum 1 will now be described. As shown in FIG. 9, the amount of radial displacement of the medium-winding surface 3 starting from the state of response of the drum when the drum rotates increases as the rotation frequency increased; however, the amplitude of deformation of the medium-winding surface 3 within the overall circumference was very small, that is, 0.2 $\mu$m at 5,000 rpm, and less than 0.4 $\mu$m at 10,000 rpm. Therefore, there is almost no influence on the contact between the magnetic head and the magnetic recording medium, thus enabling stable read and write operations.

Next, reference is now made to the relation between the index e representative of variations in the thickness of the rotating drum and a deformation index p determined by the material of the drum, the external dimensions of the drum and the rotation frequency thereof. First, the index e representative of variations in the thickness of the drum will be first described. In the case where the width (w) 14 of the opening or notch in the circumferential direction of the drum is smaller than the thickness (t) thereof, the reduction of the weight due to the provision of the opening or notch is small. Therefore, the thickness (a) and the thickness (b) may be almost equal to each other, and in this case the value of e approaches "1". On the other hand, in the case where the width (w) 14 of the opening or notch becomes greater, the reduction of the weight due to the provision of the opening or notch increases. As a result, the center of gravity is displaced from the axis (center) of rotation of the rotating drum. To avoid this, it is necessary to increase the variation in the thickness of the rotating drum, in which case the value of e becomes smaller.

Next, the deformation index p determined by the material and external dimensions of the rotating drum and the rotation frequency of the drum will now be described. The centrifugal force acting on each part of the rotating drum depends on the sectional shape of the rotating drum, the modulus of longitudinal elasticity of the material constituting the drum, the density of this material, and the rotation frequency of the drum. The following formula is established:

$$p = 1 - (0.025 \cdot N^2 \cdot (h/2r))/(E/\rho)$$

where r represents the radius of the outer peripheral surface of the rotating drum, h represents the depth of the inner peripheral surface of the rotating drum extending between the upper end of the drum and the inner bottom surface, N represents the rotation frequency (rpm), E represents the modulus (Pa) of longitudinal elasticity of the material constituting the rotating drum, and $\rho$ represents the density (kg/m$^3$) of the material of the rotating drum. As a result of the analysis, it has been confirmed that (e<p) is reasonable in the case where the width w of the opening or notch in the circumferential direction of the drum is greater than the thickness t of the opening or notch (that is, t<w), and that (p≦e<1.0) is reasonable in the case where the thickness t of the opening or notch is equal to or greater than the width w thereof (that is, t≧w).

Figure 10:
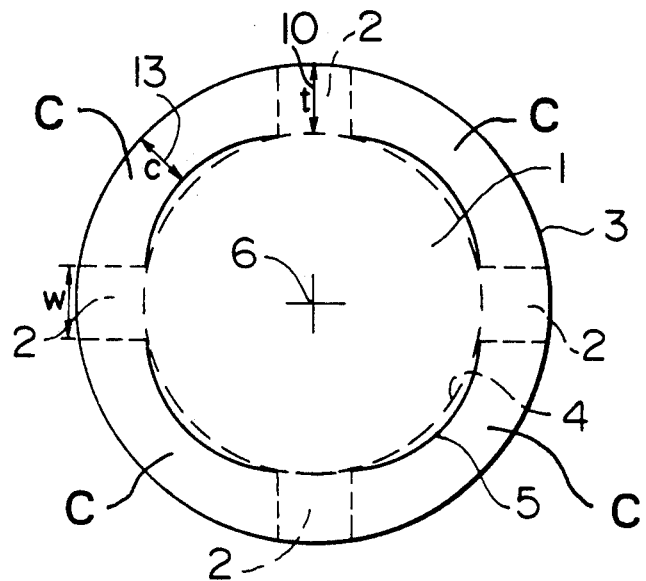
FIG. 10 is a top plan view of a rotating drum according to another embodiment of the invention.

FIG. 10 shows another embodiment of the invention. In this embodiment, the thickness (c) 13 of that portion C of the peripheral wall of a rotating drum 1 situated intermediate each two adjacent openings or notches 2 is smaller than the thickness (t) 10 of the opening or notch 2 over a range greater than the width (w) of the opening or notch 2 in the circumferential direction of the drum. With this arrangement, the displacement of the center of gravity of the drum 1 from the axis of rotation of the drum 1, which results from the reduction of the weight due to the provision of the openings or notches 2, can be corrected.

Figure 11:
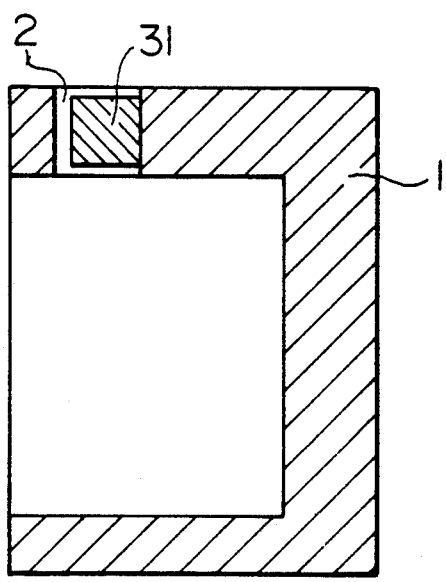
FIGS. 11 and 12 are sectional views of rotating drums according to still other embodiments of the invention, respectively.

FIG. 11 shows a further embodiment of the invention. In this embodiment, in order to compensate for the reduction of the weight due to the provision of the opening or notch 2, a balance weight 31, equivalent in weight to the amount of reduction of the weight of the drum due to the provision of the opening or notch 2, is mounted in the opening or notch 2. In order not to adversely affect the function of the opening or notch 2 as a space, the balance weight 31 can be made of a material greater in specific gravity than the material constituting the rotating drum, so that the volume of the balance weight 31 can be small. For example, if the rotating drum 1 is made of an aluminum alloy, the balance weight 31 is suitably made of a metallic material such as tungsten, brass and stainless steel. With this method, the irregularity or unevenness of the weight of the rotating drum can be easily corrected, and therefore this method is useful particularly in a case where the above-mentioned working of the inner peripheral surface of the rotating drum is limited for some reasons.

Figure 12:
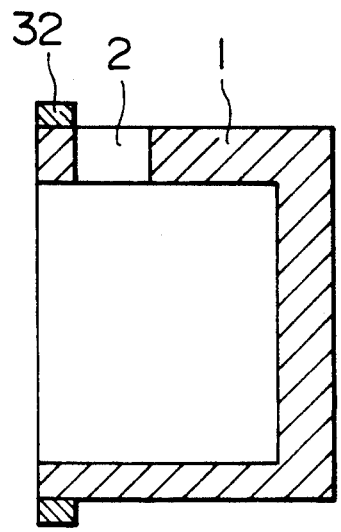

FIG. 12 shows a further embodiment of the invention. In this embodiment, a ring 32, which has an inner diameter equal to the diameter of the outer peripheral surface of a rotating drum 1, is fitted on the outer peripheral surface of the drum adjacent to the upper end thereof. Preferably, the ring 32 should be made of a material which is as low in specific gravity as possible and has a high rigidity. Further, in order to prevent an irregular deformation of the ring 32 during the rotation of the drum 1, it is necessary that the ring 32 be precisely worked or finished in such a manner that the inner and outer diameters thereof be uniform over the entire inner and outer peripheries thereof. By fitting the ring 32 on the rotating drum 1, an irregular deformation of the magnetic recording medium-winding surface of the rotating drum during the high-speed rotation of the drum can be restrained.

Figure 6:
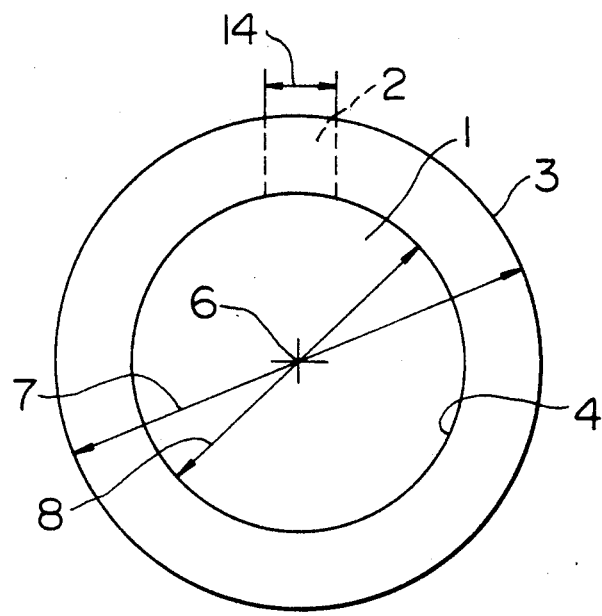
FIG. 6 is a view showing the shape of the conventional rotating drum.
Figure 7:
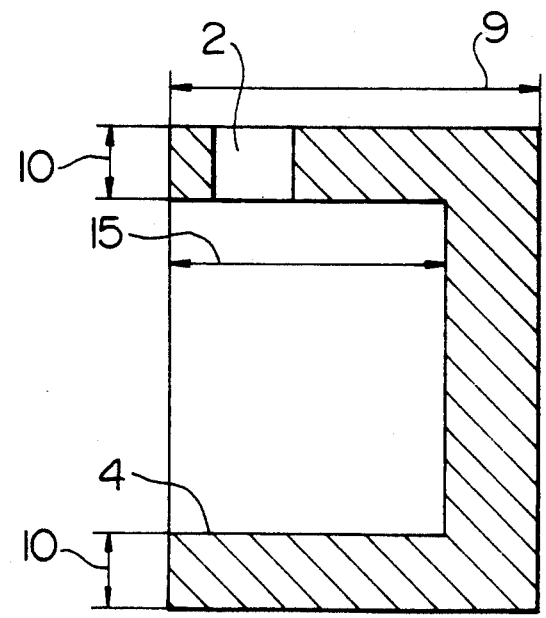
FIG. 7 is a sectional view of the conventional rotating drum of FIG. 6.
Figure 8:
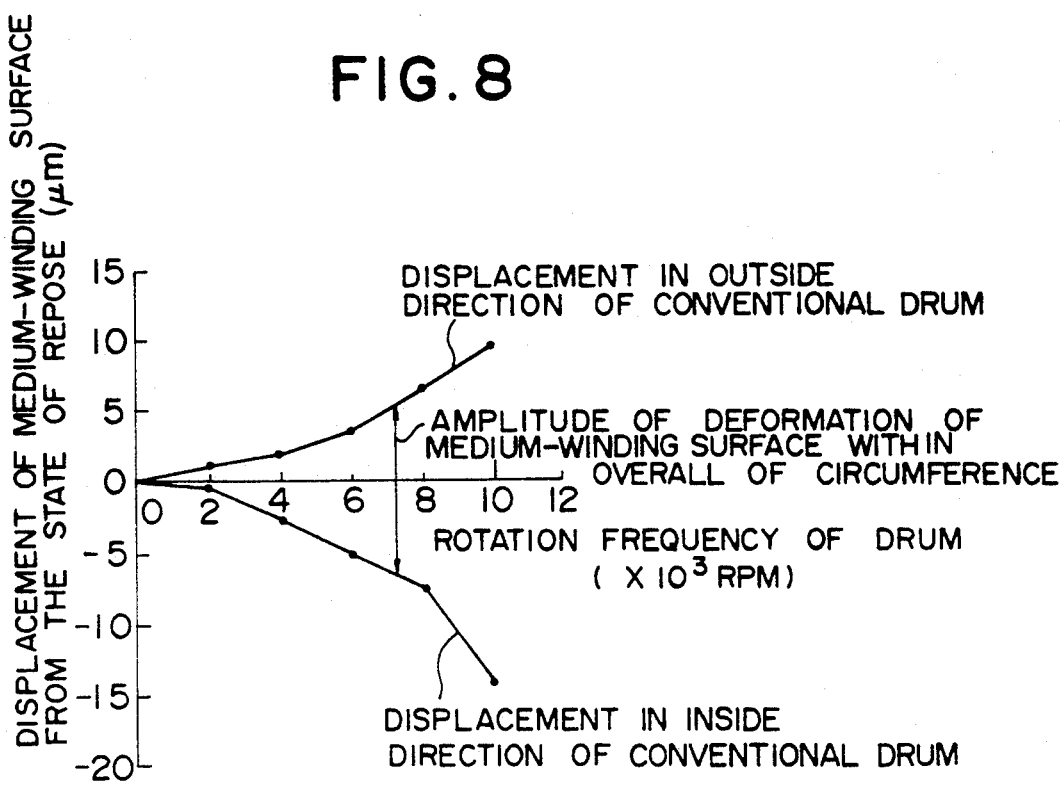
FIG. 8 is a graph showing the amount or amplitude of deformation of the conventional rotating drum.
Figure 13:
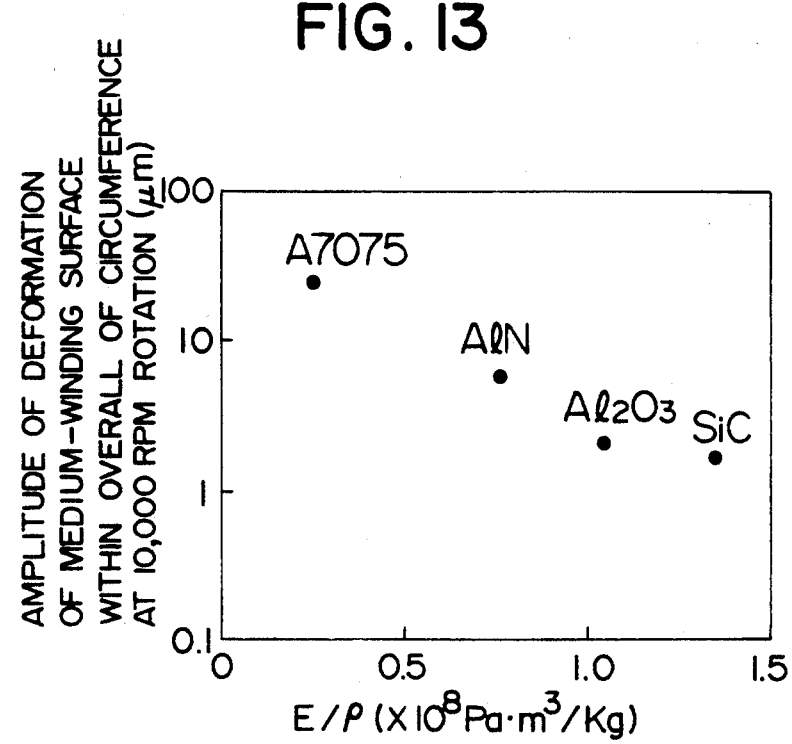
FIG. 13 is a graph showing the relation between materials of the rotating drum and the amount or amplitude of deformation thereof.

Samples of the conventional rotating drum shown in FIGS. 6 and 7 were respectively made of several materials in which the ratio (E/$\rho$) of the modulus of longitudinal elasticity to the density was high. FIG. 13 shows results of measurements of deformation of the magnetic recording medium-winding surface 3 of those drums obtained when each drum was rotated at 10,000 rpm. The materials used for such samples were aluminum nitride (AlN; E/$\rho$=0.79×10$^8$ (Pa·m$^3$/kg)), alumina (Al$_2$O$_3$; E/$\rho$=1.03×10$^8$) and silicon carbide (SiC; E$\rho$=1.37×10$^8$). As shown in FIG. 13, the greater the ratio (E/$\rho$) was, the smaller the amplitude of deformation within the overall circumference was. Particularly, in case of the alumina and the silicon carbide, this value was as small as about 1.5 $\mu$m which offers almost no problem in practical use. Therefore, by using the material in which E/$\rho$ is greater than 1.0×10$^8$Pa·m$^3$/kg, the rotating drum, which is only subjected to a small amount of irregular deformation during the rotation of the drum, can be provided by adding slight corrections to the conventional shape of the drum.

Figure 14:
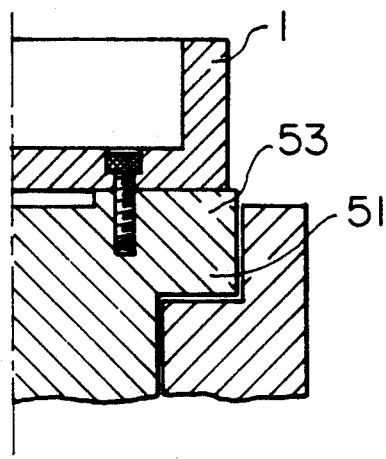
FIGS. 14 an 15 are fragmentary, sectional views of rotating drum devices according to embodiments of the present invention, respectively.
Figure 15:
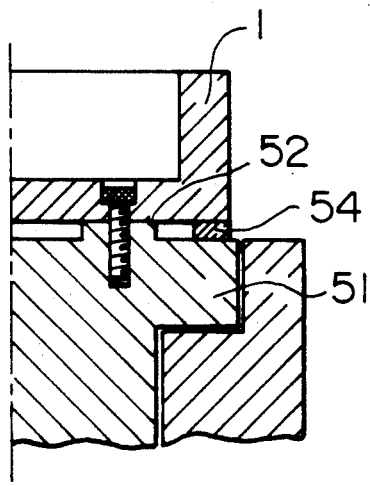
Figure 16:
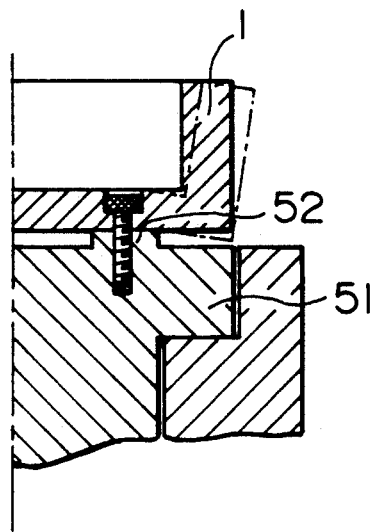
FIG. 16 is a fragmentary, cross-sectional view of a conventional rotating drum device.

FIGS. 14 and 15 are fragmentary, sectional views of rotating drum devices each comprising a rotating drum according to an embodiment of the present invention and a rotary drive system for driving the drum for rotation. In a conventional rotating drum device as shown in FIG. 16, a rotating member and a rotary drive system (for example, a spindle) are connected or fastened together at their respective connecting or abutting surfaces. More specifically, the bottom surface of the rotating drum 1 is mated with a precisely-machined or finished surface of a step portion 52 on the connecting surface of the rotary drive system 51, and is fastened thereto by bolts or the like, this precisely-finished surface having high surface precisions such as a high degree of flatness and a low surface roughness. The step portion 52 is provided because it is difficult to ensure high surface precisions uniformly over the entire connecting or abutting surface of the rotary drive system, and therefore a limited area of such connecting surface is used as the mating surface so as to ensure high surface precisions thereof. With this arrangement, however, when the rotating member, liable to deformation during a high-speed rotation thereof, such as a rotating drum, is connected to the rotary drive system, the outer peripheral surface of the rotating drum is liable to be deformed outwardly as indicated in a dot-and-dash line in FIG. 16. This problem can be avoided by eliminating a space between the outer peripheral portion of the bottom surface of the rotating member and the connecting surface of the rotary drive system. In the embodiment of the invention shown in FIG. 14, a step portion 53 is extended at least to the outer periphery of the bottom surface of the rotating drum 1. With this construction, the deformation of the rotating drum 1 can be restrained. In the case where a space is inevitably provided between the outer peripheral portion of the bottom surface of the rotating member and the connecting surface of the rotary drive system, a spacer 54 of a high-rigidity material equal to or greater than the above space in thickness is received in this space, as shown in FIG. 15.

Figure 17:
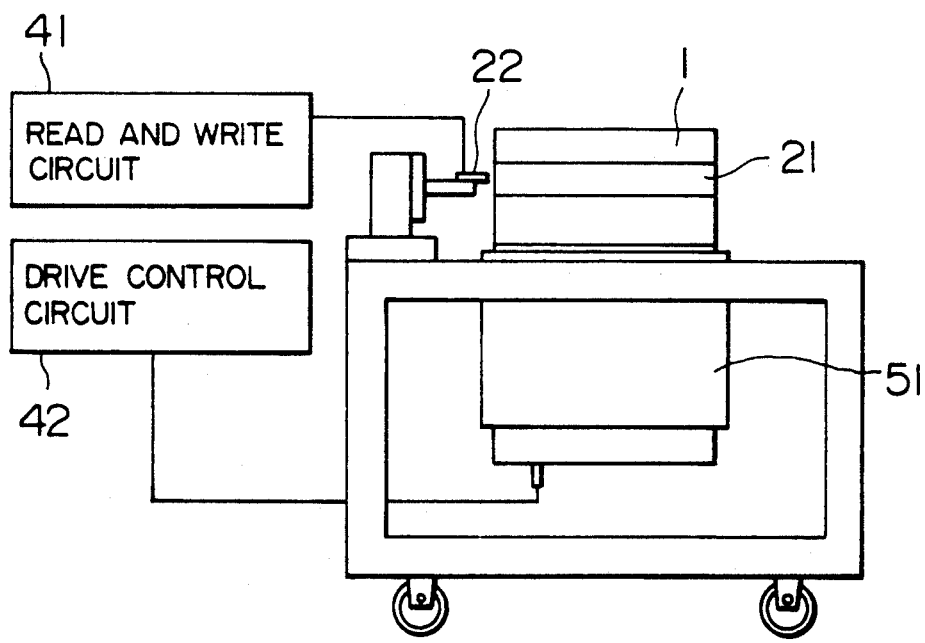
FIG. 17 is a schematic view of a magnetic-recording characteristics measuring system having a rotating drum and a rotating drum device in accordance with an embodiment of the present invention.

FIG. 17 shows one example of a magnetic-recording characteristics measuring system having a rotating drum according to an embodiment of the present invention and a rotating drum device according to an embodiment of the present invention. The rotating drum 1 having a magnetic recording medium 21 wound thereon is connected or fastened to a rotary drive system 51. The rotating drum 1 is rotated so as to effect read and write operations by a magnetic head 22. The posture of the magnetic head 22 can be desirably changed by an adjustment mechanism so as to adjust the condition of contact between the magnetic head 22 and the magnetic recording medium 21. This measuring system further comprises a read and write circuit 41 for recording signals on the magnetic recording medium 21 through the magnetic head 22 and for processing the signals from the magnetic recording medium 21, and a drive control circuit 42 for controlling the rotary drive system.

Information to be recorded on the magnetic recording medium 21 is fed in the form of electric signals to the magnetic head 22 through the read and write circuit, and these electric signals are magnetically recorded on the magnetic recording medium wound on the outer peripheral surface of the rotating drum 1 rotating at a predetermined speed (rotation frequency). The magnetic information recorded on the magnetic recording medium 21 is read in the form of electric signals by the magnetic head 22. In this case, the information may be read by another magnetic head different from the above-mentioned magnetic head 22. The read-out electric signals are processed by the read and write circuit 41, and are analyzed by a recording characteristics evaluating device such as an oscilloscope and a spectrum analyzer. In this manner, the analysis of the recording characteristics of the magnetic head and the magnetic recording medium which are indispensable to the development of the magnetic recording system can be carried out.

Features of this measuring system are that since the rotating drum contains the magnetic recording medium, the measurement can be suitably carried out even if the magnetic recording medium is relatively short, and that since the posture of the magnetic head can be adjusted from the exterior, the condition of contact between the magnetic head and the magnetic recording medium can be easily controlled.

According to the present invention, the shape correction is beforehand applied to the rotating drum so as to restrain the irregular deformation of the drum which would be caused by the displacement of the center of gravity of the drum due to the provision of the opening or notch in the drum. Therefore, even if the drum is rotated at the predetermined speed (rotation frequency), the deformation of the magnetic recording medium-winding surface of the drum can be made uniform. Further, the provision of the means for enhancing the close contact between the connecting or mating surfaces of the rotating drum and the rotary drive system is effective in preventing the deformation of the magnetic recording medium-winding surface of the rotating drum. With these arrangements, the contact between the magnetic head and the magnetic recording medium-winding surface can be kept very stable, thereby enhancing the reliability and stability in the read and write characteristics.

What is claimed is:

1. A rotating drum for a magnetic read/write system adapted to be rotated at a high speed around an axis thereof, comprising:

a generally hollow cylindrical drum body having at least one opening in a peripheral wall thereof, said peripheral wall having a radial thickness varying along a circumferential direction thereof to minimize deformation of said peripheral wall due to a variation in a magnitude of centrifugal force dependent on a circumferential position thereof due to a presence of the at least one opening.

2. A rotating drum according to claim 1, in which a portion of the peripheral wall of said drum body including a portion A of the peripheral wall situated symmetrically to said at least one opening with respect to an axis of rotation of said drum body has a radial thickness smaller than a radial thickness t of the peripheral wall at said at least one opening, said portion A extending in a circumferential direction of the peripheral wall at least over a range greater than a width w of said opening in the circumferential direction of said drum body.

3. A rotating drum according to claim 1, in which the peripheral wall of said drum body has diametrically-opposite portions B angularly displaced from ±90° from said at least one opening, a radial thickness b of each of said diametrically-opposite portions B being smaller than a radial thickness a of a portion A of said peripheral wall situated symmetrically to said at least one opening with respect to an axis of rotation of said drum body, a radial thickness of said peripheral wall of said drum body gradually decreasing from said portion A toward each of said diametrically-opposite portions B.

4. A rotating drum according to claim 1, wherein a relationship satisfying the following formula is established:

$$\rho = 1 - (0.025 \cdot N^2 \cdot (h/2r))/(E/\rho)$$

where r represents a radius of an outer peripheral surface of said drum body, h represents a depth of an inner peripheral surface of said drum body extending between an upper end of said drum body and an inner bottom surface of said drum body, N represents a rotation speed, E (Pa) represents a modulus of longitudinal elasticity of a material constituting said drum body, and $\rho(kg/m^3)$ represents a density of the material of said drum body; and wherein a variable e representative of a relation between a radial thickness b of diametrically-opposite portions B of the peripheral wall angularly displaced ±90° from said at least one opening and a radial thickness a of a portion A of said peripheral wall situated symmetrically to said at least one opening with respect to an axis of rotation of said drum body is represented by the formula, $e = (r-a)/(r-b)$ for the radius r of the outer peripheral surface;

when a width w of said at least one opening in a circumferential direction of said drum body is equal to or smaller than a radial thickness t of the peripheral wall at said at least one opening (i.e., $w \leq t$), the relationship $p \leq e < 1.0$ holds; and when the radial thickness t is smaller than the width w (i.e., $t < w$), the relationship $e < p$ holds.

5. A rotating drum according to claim 1 in which said drum body has a plurality of openings of a substantially identical shape in the peripheral wall, and a portion of the peripheral wall including a portion C of the peripheral wall of said drum body situated intermediate between two adjacent openings has a radial thickness smaller than a radial thickness t of the peripheral wall at each of said openings, said portion C extending in a circumferential direction of said drum body over a range greater than a width w of each of said openings in the circumferential direction of the drum body.

6. A rotating drum according to claim 1, in which said drum body is made from a material in which a ratio $(E/\rho)$ of its modulus of longitudinal elasticity to its density is greater than $1.0 \times 10^8$ Pa·m$^3$/kg.

7. A rotating drum according to claim 1, further comprising rotary drive means for driving said drum body for rotation, said rotary drive means having a connection surface fastened to said drum body; said drum body having a bottom surface, an outer peripheral edge of said bottom surface being held in close contact with said connection surface of said rotary drive means.

8. A rotating drum for a magnetic read/write system adapted to be rotated at a high speed around an axis thereof, comprising:

a generally hollow cylindrical drum body having at least one opening in a peripheral wall thereof; and a balance weight mounted in said at least one opening to minimize deformation of said peripheral wall due to a variation in a magnitude of centrifugal force dependent on a circumferential position thereof due to a presence of the at least one opening, said balance weight having a density greater than a density of said drum body and being substantially equivalent in weight to an amount reduction of a weight of said drum body due to provision of said at least one opening.

9. A rotating drum for a magnetic read/write system adapted to be rotated at a high speed around an axis thereof, comprising:

a generally hollow cylindrical drum body having at least one opening in a peripheral wall thereof; and a strip-like ring made of a high-rigidity material and fitted on an outer peripheral surface of said drum body adjacent to an upper end of said drum body to minimize deformation of said peripheral wall due to a variation in a magnitude of centrifugal force dependent on a circumferential position thereof due to a presence of the at least one opening.

* * * * *